INVENTORS
JACK MITCHELL BUIST
GUILLAUME WARD JAMIN

ATTORNEYS

May 4, 1954

J. M. BUIST ET AL 2,677,187

APPARATUS FOR MEASURING THE EXTENSION UNDER
TENSION OF A SAMPLE OF RUBBER-LIKE MATERIAL

Filed Aug. 11, 1950

INVENTORS
JACK MITCHELL BUIST
GUILLAUME WARD JAMIN

Cushman, Darby Cushman
ATTORNEYS

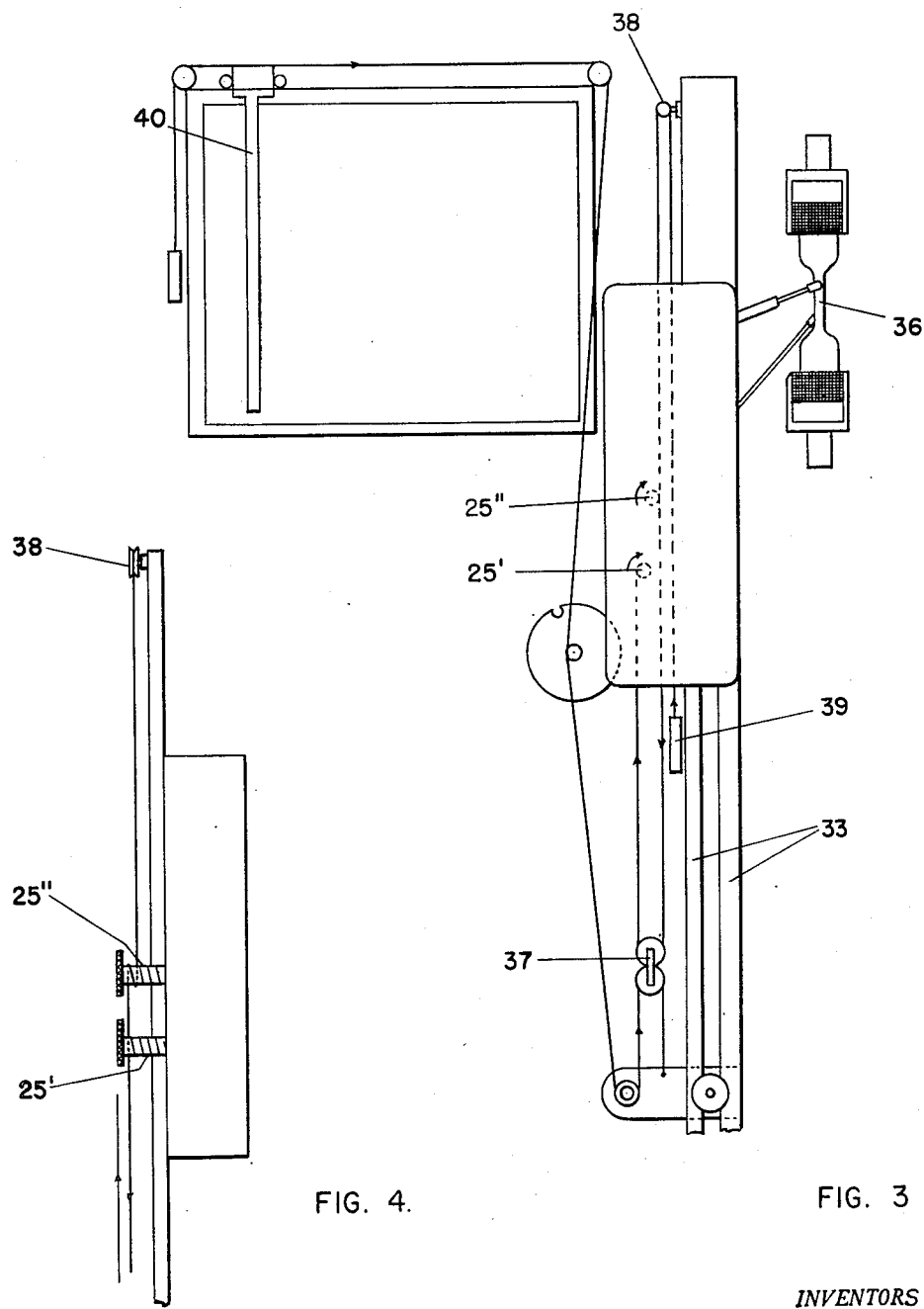

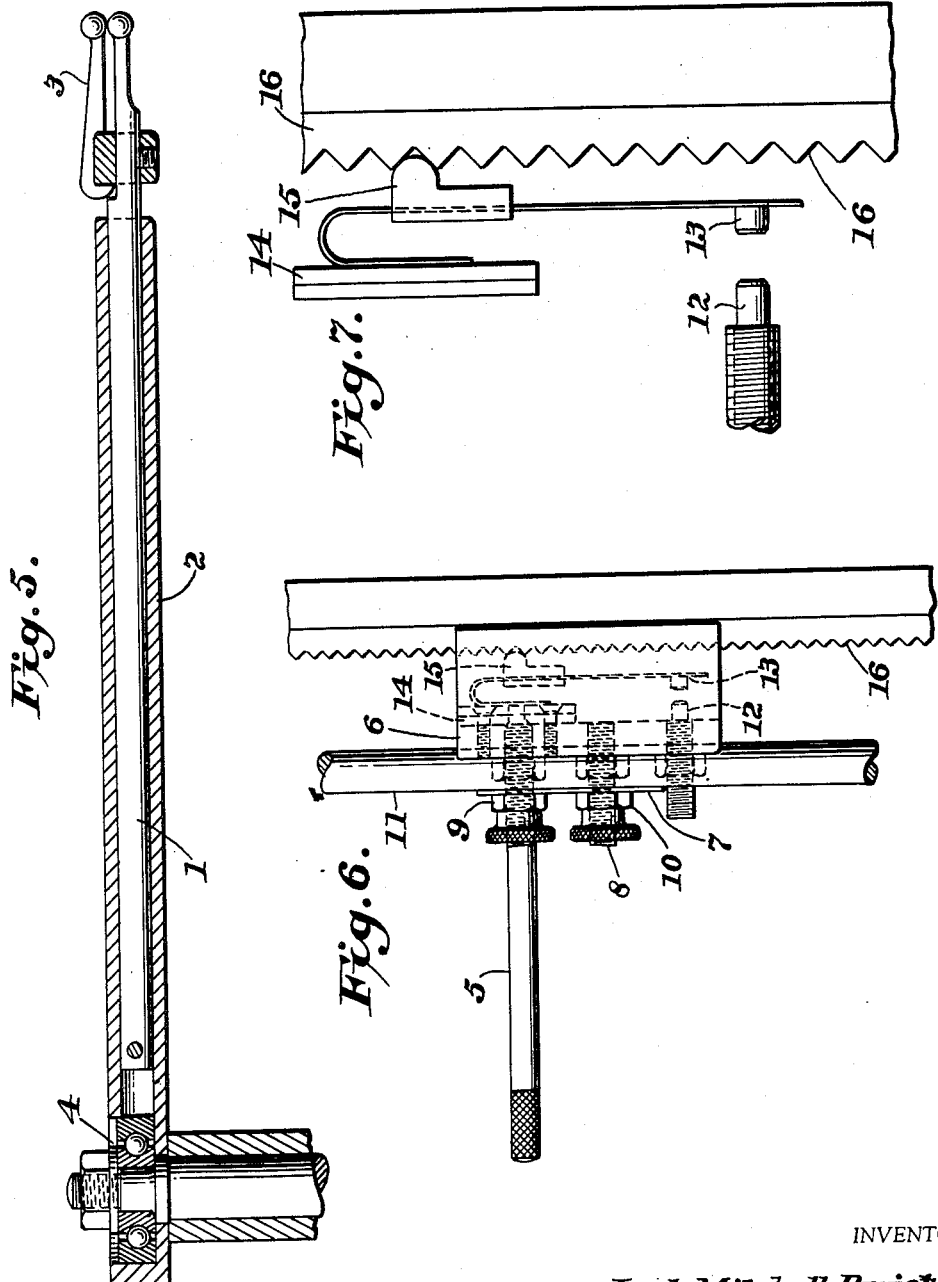

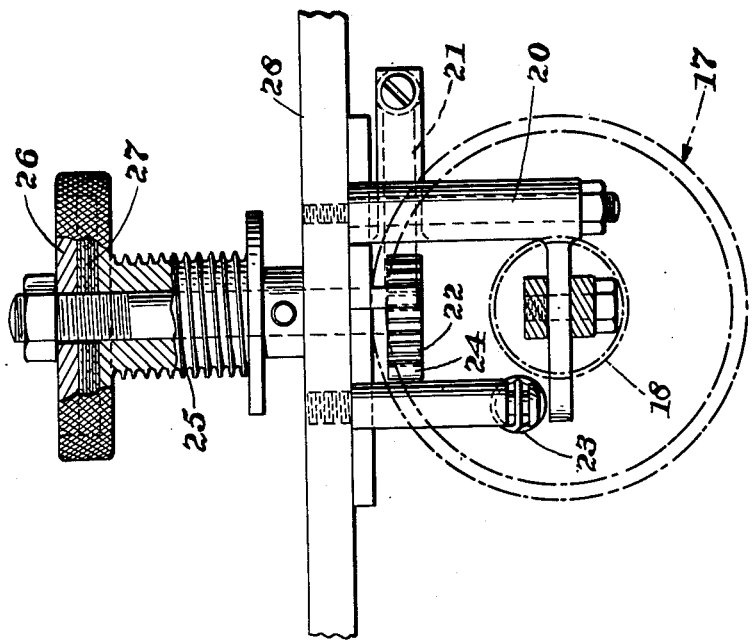
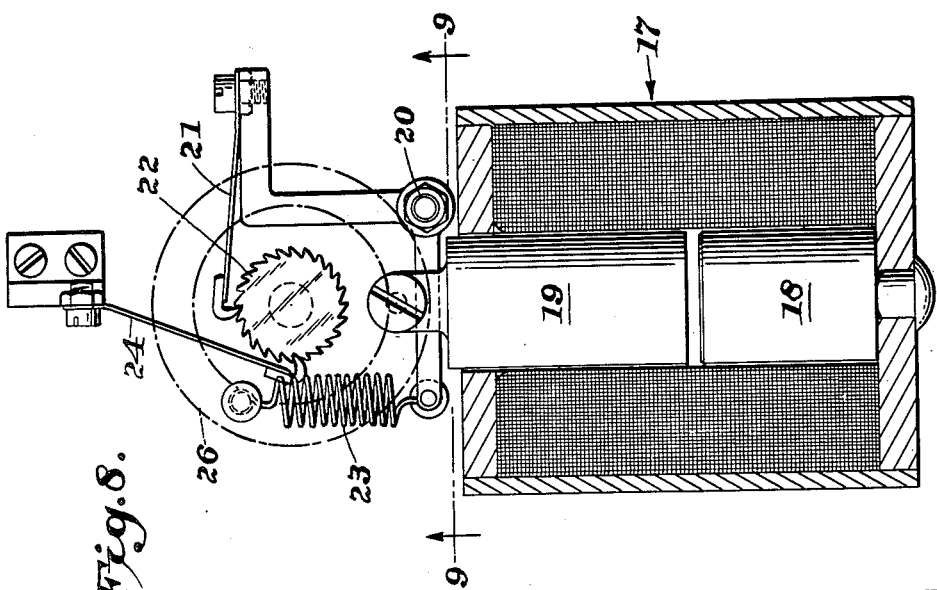

Patented May 4, 1954

2,677,187

UNITED STATES PATENT OFFICE 2,677,187

APPARATUS FOR MEASURING THE EXTENSION UNDER TENSION OF A SAMPLE OF RUBBER-LIKE MATERIAL

Jack Mitchell Buist and Guillaume Ward Jamin, Blackley, Manchester, England, assignors to Imperial Chemical Industries Limited, a corporation of Great Britain Application August 11, 1950, Serial No. 178,902

Claims priority, application Great Britain February 6, 1950

5 Claims. (Cl. 33—148)

1

This invention relates to a method and an apparatus for measuring the extension under tension of a sample of rubber or the like and more particularly to such an extensometer for use with rubber dumb-bell or strip samples as used in a Schopper tensile testing machine.

The normal method employed for measuring the tensile strength of rubber is to submit a suitably shaped sample, such as the "dumb-bell" to a steadily increasing tension and to record the maximum tension attained before the sample breaks. Attempts have been made to observe also the extension of the sample under load, by measuring the increase in the distance between two marks on the sample. The measurement and recording of the increase in the distance is rendered difficult, however, by the flexibility of the sample and by the fact that neither of the marks on the sample remains stationary.

By the use of our extensometer these difficulties are overcome and a method is provided for the continuous measurement and recording, if desired, graphically, of the distance between two marks on the rubber sample. The use of our extensometer is not restricted to rubber samples; it can be employed generally for the measurement and recording of a varying distance between two points, one or both of which are moving, on a material under examination.

According to our invention we provide a method of measuring the extension under tension of a sample of rubber or the like which comprises transmitting by means of levers the motion of two points on the sample to two sliding contact assemblies each of which operates repeatedly, while sliding, a make and break in an electrical circuit energising an electro-magnet which drives a ratchet-wheel through an armature and pawl, and utilising the difference in the motions of the two ratchet-wheels as a measure of the extension of the sample.

The transmission of the motion of two points on the sample to the two sliding contact assemblies may be achieved by means of two light telescopic arms, pivoted at one end and attached at the other end to the rubber by, for example, a light spring clip, designed so as not to injure the rubber. In the Schopper tensile testing machine, the dumb-bell rubber sample is held in a vertical position and the tension is applied vertically downwards. Thus the motion of the rubber sample causes the telescopic arms to move in a vertical plane; the telescopic arms, in turn, bear upon the sliding contact assemblies and move them downwards, the lower assembly mov-

2 ing more rapidly than the upper. The frictional resistance of the sliding contact assemblies may advantageously be adjusted so as to balance the weight of the assembly and of the telescopic arm.

The make and break in the electrical circuit is conveniently achieved by means of a fine tooth rack and a follower attached to the sliding contact assembly. The faster moving lower contact assembly will make and break its electrical circuit more frequently than the slower moving upper contact assembly and this difference will result in a more rapid rotation of the corresponding ratchet-wheel.

In order to utilise this difference in the rates of rotation of the ratchet-wheels, they may be frictionally attached to two winches round which a cord is wound so that rotation of the winch corresponding to the upper mark on the rubber sample feeds out cord and rotation of the winch corresponding to the lower mark on the rubber sample takes up cord. The combined result of these operations is to take up cord and by means of a suitable assembly of pulleys and cords this result can readily be made to propel, for example, a carriage bearing a pen over a sheet of graph paper.

According to a further feature of our invention we provide an apparatus for measuring the extension under tension of a sample of rubber or the like which comprises two telescopic arms each of which is pivoted at one end and carries at the other end a light clip suitable for attachment to a rubber sample and bears upon a sliding contact assembly which operates repeatedly, while sliding, a make and break in an electrical circuit energising an electro-magnet which operates a friction-driven winch through an armature and pawl and ratchet-wheel.

The invention is illustrated but not limited by reference to the accompanying drawings wherein Fig. 1 shows a front elevation of our extensometer, Fig. 2 shows a side elevation of the same, Fig. 3 shows a front elevation of the arrangement of cordage on a Schopper testing machine to suit our extensometer and Fig. 4 shows a side elevation of the same.

Fig. 5 is a sectional plan view of the telescoping arm and clip member on an enlarged scale;

Fig. 6 is an enlarged detailed elevation of one of the sliding contact assemblies;

Fig. 7 is a fragmentary elevation of the rack, follower and contacts of the sliding contact assembly still further enlarged;

Fig. 8 is an elevation partly in section of the pawl and ratchet mechanism on an enlarged scale; and Fig. 9 is an end view of the pawl and ratchet mechanism substantially on line 9—9 of Fig. 8.

Figure 1:
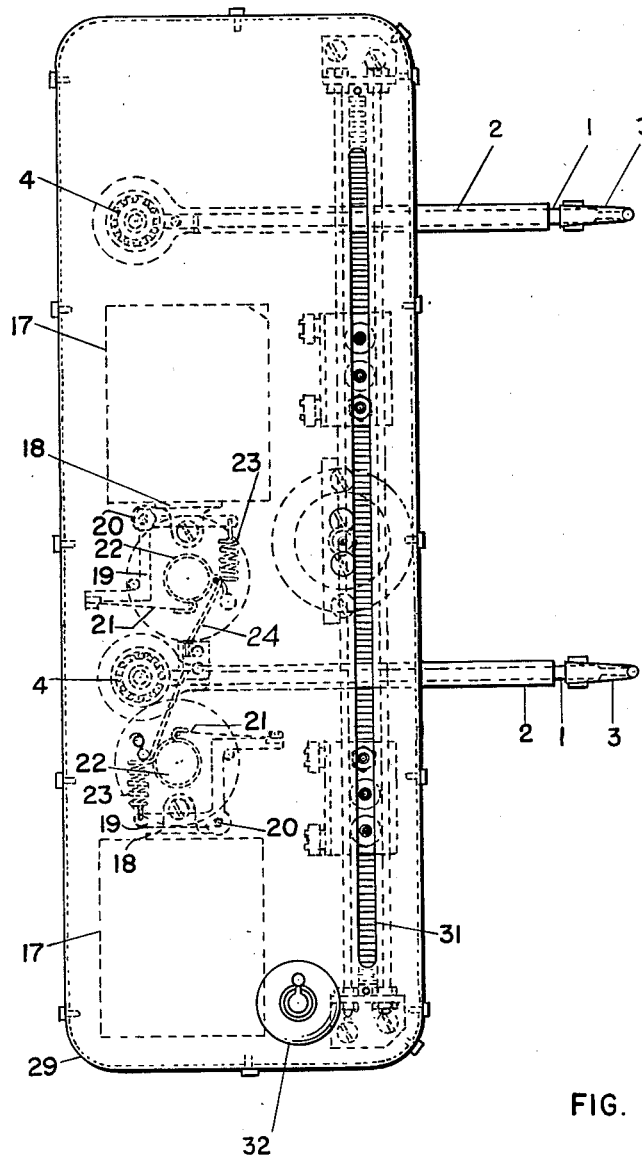

In the drawings the sliding rod 1, arm 2 and spring clip 3 make up the telescopic arm pivoted on a ball-race and pillar 4. The telescopic arm bears upon the projecting stud 5 of the sliding contact assembly made up of back slide plate 6 and front slide plate 7, clamped by means of studs 5 and 8 and nuts 9 and 10 so as to slide with friction on the two guide rods 11, and adjustable contact 12 and spring contact 13 which is insulated from back slide plate 6 by insulating plate 14 and which carries a fibre heel or follower 15 bearing on rack 16.

As indicated, the sliding contact assembly is made up of back slide plate 6 and front slide plate 7, clamped by means of studs 5 and 8 and nuts 9 and 10 so as to slide with friction on the two guide rods 11. A flexible spring contact arm 13 is attached through insulating plate 14 to the back slide plate 6 so that there is no electrical contact between the spring contact and the back slide plate. The fiber heel or follower 15 is attached to the spring contact arm and is pressed firmly by the spring arm onto the rack 16. As the sliding contact assembly moves along the guide rods the fiber heel moves over the toothed rack and is thereby caused to oscillate towards and away from the main body of the sliding contact assembly. Thereby the spring contact arm is bent towards and away from the sliding contact assembly and the gap between the adjustable contact 12 and the spring contact 13 is alternately closed and opened.

Each sliding contact assembly is connected electrically in series with an electromagnet 17, and the electrical impulses passed by the alternating make and break of the sliding contact assemblies serve to operate said electromagnets which have core 18 and armature 19 pivoted at 20 and carrying pawl and spring 21 driving ratchet-wheel 22.

Figure 2:
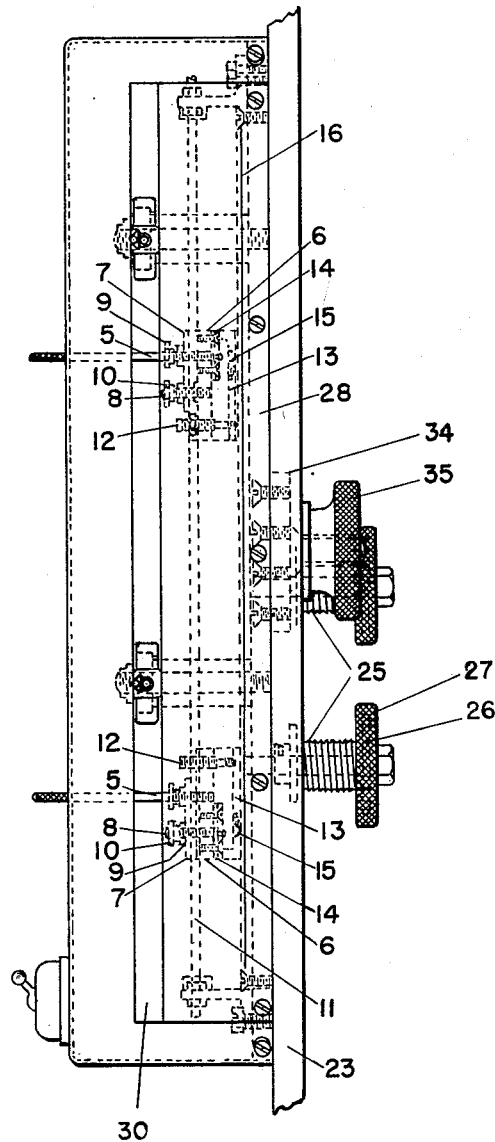

When the armature 19 is drawn towards the electromagnet 17, the pawl 21 is caused to advance over the ratchet-wheel 22 and engage with a tooth on the ratchet-wheel further round in an anti-clockwise direction as seen in Figure 1. When the armature is released by the electromagnet (by the break in the electrical circuit), the pawl, by virtue of the spring 23, pulls the ratchet-wheel round in a clockwise direction through a distance equivalent to one tooth of the ratchet-wheel. The ratchet-wheel is secured to a shaft passing through the base plate 28 and the winch 25 is mounted on the shaft and free to rotate thereon. The drive is transmitted from the shaft to the winch by friction through the metal washer 26 and cork washer 27 which are pressed onto the flange of the winch by means of the nut shown on the right hand side of the shaft in Figure 2. The tumbler switch is in series with one electrical lead to the electromagnet; the other electrical lead is the body of the instrument up to the adjustable contact 12, and a wire soldered onto the spring contact arm 13 completes the circuit to the electromagnet. The armature 19 is held away from the core 18 by a spring 23 and reverse motion of the ratchet-wheel is prevented by retaining pawl and spring 24.

The pillars 4, the guide rods 11 and the electromagnets etc. and winches are mounted on a base plate 28 and enclosed by a cover 29 having two slots 30 and 31 to allow for the movement of the telescopic arms and the projecting studs 5 respectively and carrying a tumbler switch 32 to control the electrical feed. The electrical connections are not shown in the drawings; the body of the instrument is utilised as one conductor and the lead from the magnet is soldered onto the spring contact 13.

The extensometer is secured to the slide rails 33 of the Schopper tensile testing machine by means of a guide key 34 and a locking nut 35. The spring clips 3 on the telescopic arms are fixed to the dumb-bell rubber sample 36 at selected points (usually 1" apart).

A cord is anchored at one end to the lower winch 25′, is taken round pulley 37, wound twice round upper winch 25″ and taken over pulley 38; a counter-balancing weight 39 is attached to the free end of the cord.

The motion of pulley 37 is transmitted through a simple pulley and cord system to the carriage 40. Thus extension of the rubber sample is registered as a horizontal movement of the carriage and there is a linear relationship between the displacement of the carriage and the extension of the rubber sample. The tension applied is registered by the usual means as a vertical movement of a pen on the carriage and thus a stress-strain diagram is automatically drawn on a suitably mounted paper. The physical properties of the rubber, such as tensile strength, elongation and modulus, can be read from the stress-strain diagram so-obtained. By the use of our extensometer these stress-strain diagrams are very readily prepared by one operator with elimination of "personal error" in the measurements.

Having now particularly described and ascertained the nature of our said invention and in what manner the same is to be performed, we declare that what we claim is:

1. Apparatus for measuring the extension under tension of a sample of rubber-like material which comprises a toothed rack, a pair of telescopic arms movable in a vertical plane, each of which is pivoted at one end, light clip members on the free ends of said arms to be attached to the sample of material being tested, each of said arms bearing upon a sliding electrical contact assembly adapted for sliding motion along said toothed rack so that movement of said arms causes said electrical contact assemblies to slide along said toothed rack, said electrical contact assemblies carrying followers which resiliently bear against the teeth of said rack so that the said followers will oscillate upon sliding motion of said electrical contact assemblies, said followers carrying a contact positioned in opposition to a second contact mounted upon said sliding electrical contact assemblies so that oscillation of said followers will alternately effect contact and release of said contacts to alternately make and break an electrical circuit upon movement of said arms, said circuit acting to energize an electromagnet, said electromagnet being operatively connected to a friction driven winch through an armature and pawl and ratchet-wheel.

2. Apparatus as claimed in claim 1 wherein one of said electrical contact assemblies is moved at a more rapid rate than is the other.

3. Apparatus as claimed in claim 1 wherein means are provided to adjust the frictional resistance of said sliding contact assemblies to balance the weight of said assemblies and of said telescopic arms.

4. Apparatus as claimed in claim 1 wherein one of said electrical contact assemblies is moved more rapidly than are the others whereby one of said electric circuits is made and broken more frequently than the others so as to result in a more rapid rotation of said corresponding ratchet-wheel.

5. Apparatus as claimed in claim 1 wherein said ratchet-wheels are frictionally attached to a series of winches having take up cords wound thereon, the rotation of one of said winches being responsive to the movement of one of said clip members and the rotation of another of said winches being responsive to the movement of the other of said clip members, the progressively increasing distance between said clip members corresponding to the extension under tension of said sample.

References Cited in the file of this patent

UNITED STATES PATENTS

| Number | Name | Date |
|---|---|---|
| 1,855,613 | Smith | Apr. 26, 1932 |
| 2,176,016 | Silvertsen | Oct. 10, 1939 |

FOREIGN PATENTS

| Number | Country | Date |
|---|---|---|
| 622,934 | Great Britain | May 10, 1949 |